Feb. 1, 1944. R. B. LLOYD 2,340,481
APPARATUS FOR STARTING FLOW IN WELLS
Filed June 25, 1940 2 Sheets-Sheet 1
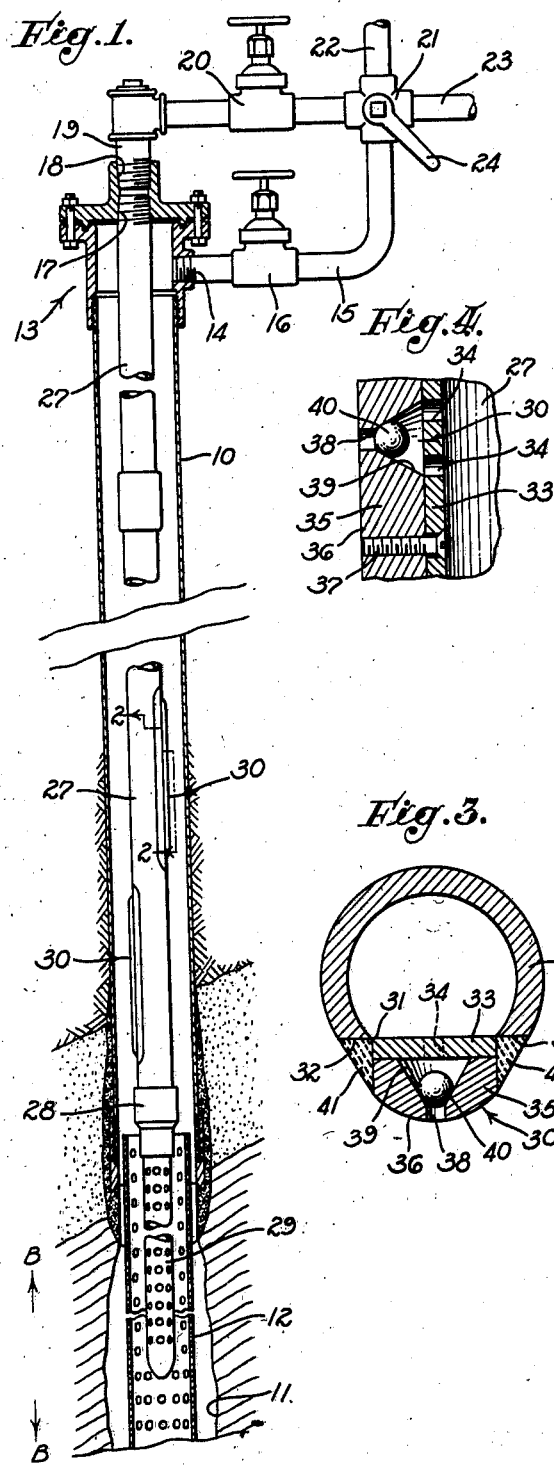
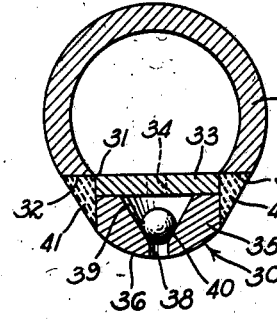
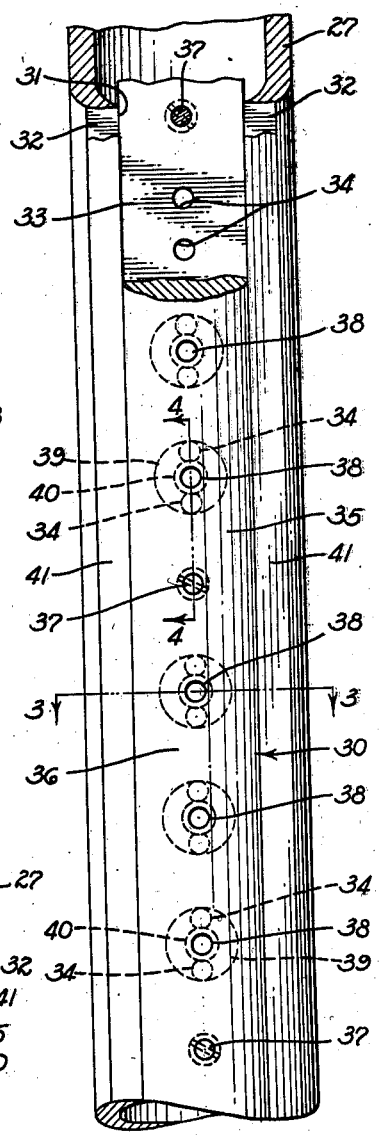
INVENTOR
RALPH B. LLOYD
BY HARRIS, KIECH, FOSTER & HARRIS
ATTORNEYS.

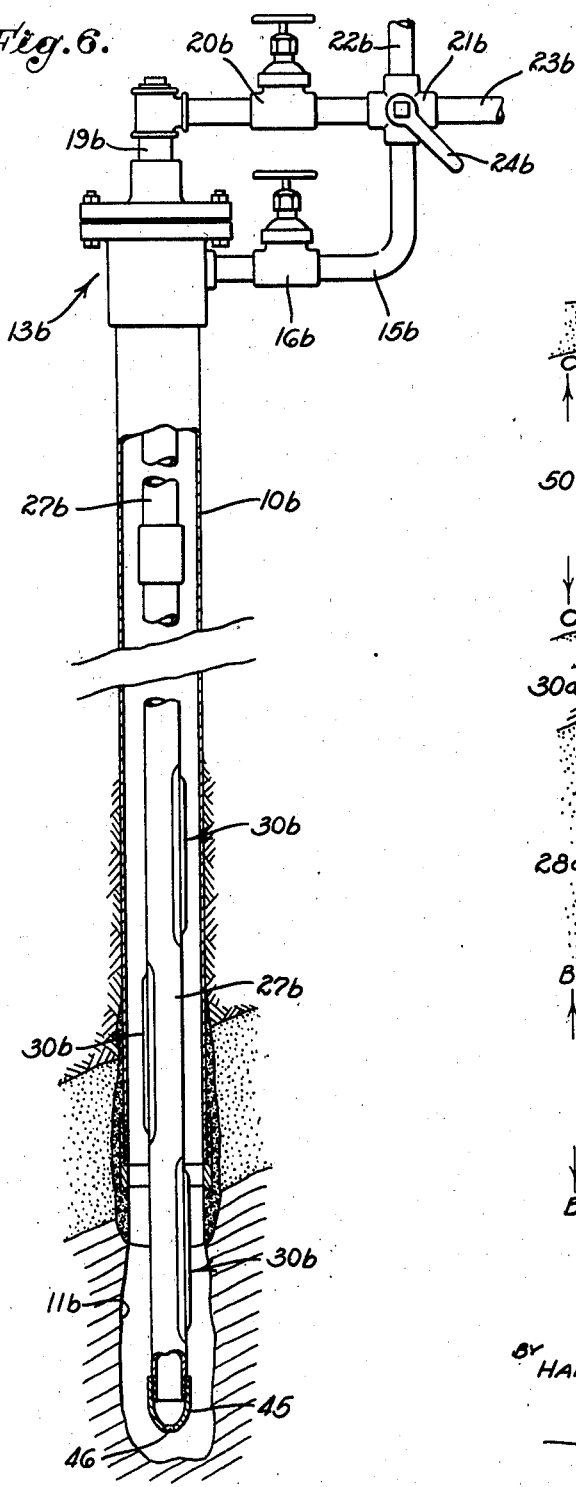
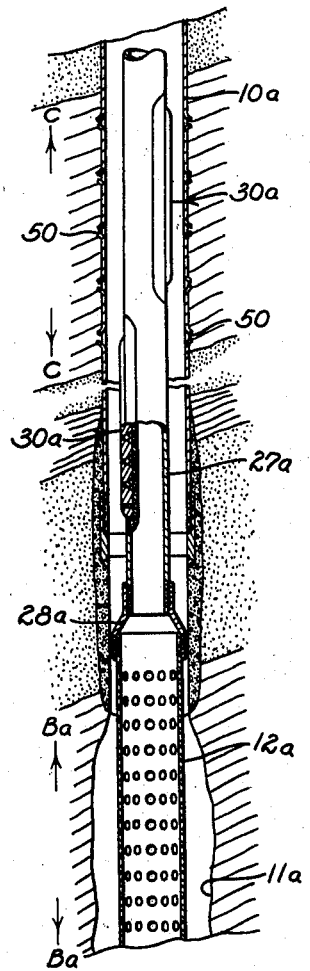

Patented Feb. 1, 1944

2,340,481

UNITED STATES PATENT OFFICE 2,340,481

APPARATUS FOR STARTING FLOW IN WELLS

Ralph B. Lloyd, Los Angeles, Calif.

Application June 25, 1940, Serial No. 342,242

5 Claims. (Cl. 166—2)

My invention relates to the well art, and more particularly to an apparatus for starting the natural flow of a well.

The invention is of particular utility in the oil industry and consequently will be described in connection therewith, although it is to be understood that the invention may be used in other applications, and I do not intend to be limited to the preferred embodiment thereof which is described herein, and which is for the purpose of illustration only.

It is standard practice in the oil industry to employ a circulation of heavy drilling mud through the hole and around the bit during drilling, which has a number of functions in the drilling operation. For example, circulation of drilling mud lubricates the drilling tools, aids directly in the drilling by hydraulic jet action, and carries out of the well the cuttings from the drilling tools. It has the further function of packing the walls of the hole with a heavy mud, which thus seals the walls against the entrance of gas, oil, water, and other substances into the well, and tends to prevent the walls from caving during the drilling. These functions are all well known in the art and are highly advantageous.

A primary disadvantage of using such a circulation of heavy drilling mud, however, is that it forms an effective seal against the flow of oil into the well from the producing formation after the conclusion of the drilling operations, thus retarding or preventing the natural flow of oil from the well. Consequently, it is standard practice in the industry to remove as much of the heavy mud from the well and the well walls as possible after conclusion of the drilling to permit the natural flow. This has been done in a variety of ways, for example, by bailing, swabbing, and exploding charges of explosives at the bottom of the hole, but all of the previously known methods have been uncertain or dangerous, or both.

It is therefore a primary object of my invention to provide an apparatus for cleaning a well and the walls thereof of drilling mud to induce a natural flow of oil from the producing formation into the well, which is certain and effective in operation and which can be fully controlled at all stages. I prefer to accomplish this by circulating a cleaning fluid, such as clean crude oil, through the well so as to remove the drilling mud therefrom and from the walls of the producing formation in the well.

It is another object of my invention to provide an apparatus for circulating a cleaning fluid, such as clean crude oil, downwardly through a well tubing to a point below the producing formation and upwardly through the well and a second well tubing to the surface of the ground to clean the well of drilling mud to permit the natural flow of oil from the formation into the well.

Another object of my invention is to provide, in a system as just described, means whereby after the natural flow of oil from the formation into the well has commenced the well oil may flow directly into a production tubing at a point substantially above the lower end thereof. I prefer to accomplish this by providing a wash string of tubing having inwardly opening valve means a substantial distance above the lower end of the wash string, the wash string being adapted to carry the flow of cleaning fluid to the bottom of the hole, and the valve means being adapted to permit the entry of well fluid therethrough into the wash string after natural flow commences.

Still another object of my invention is to provide an apparatus for starting the natural flow of a well in which a cleaning fluid is circulated through the well in one direction until the natural flow of oil from the formation into the well commences, the flow of cleaning fluid then being shut off, and the production fluid is then caused to flow in a reverse direction from said cleaning fluid. To accomplish the reversal of flow of the production fluid, either the natural rise in pressure in the well may be relied on to effect the reversal, or the reversal of flow may be positively started by pumping cleaning fluid, or other starting fluid, in such reverse direction.

A further object of my invention is to provide a plurality of check valve means longitudinally spaced along a wash string tubing for use in an oil well, in which the maximum diameter of the tubing with the check valve means installed is not greater than the diameter of the couplings of the wash string.

Other objects and advantages will be apparent from the following specification and drawings, in which:

Fig. 1 is a vertical sectional view showing my invention installed in a well.

Fig. 2 is an enlarged plan view, partly in section, taken on the line 2—2 of Fig. 1.

Fig. 3 is a cross-sectional view taken on the line 3—3 of Fig. 2.

Fig. 4 is a sectional view taken on the line 4—4 of Fig. 2.

Fig. 5 is a vertical view, partly in section, of an alternative form of my invention installed in a well.

Fig. 6 is a vertical view, partly in section, of an alternative form of my invention installed in a well.

Referring to Fig. 1 of the drawings, I show a well casing 10 set in an oil well in a manner well known in the art, leaving an uncased portion 11 at the lower end thereof directly communicating with the oil bearing formation generally designated as lying between the letters B—B. Set on the bottom of the well and projecting upwardly into the lower end of the casing 10 is a perforated liner 12 through which production oil from the oil bearing formation is adapted to flow. Connected to the upper end of the well casing 10 is a casing head 13 of any suitable construction having a threaded discharge opening 14 receiving a discharge pipe 15 which has in the line thereof a discharge valve 16 of any well known construction. Formed in the upper portion of the casing head 13 are lower and upper threaded openings 17 and 18, respectively, the upper opening 18 receiving piping 19 communicating through a valve element 20 with a four-way valve 21 of any suitable construction as is well known in the art to which is connected the discharge pipe 15, and which has connected to it a supply pipe 22 leading from the four-way valve to a suitable source of supply of cleaning fluid (not shown), and a discharge pipe 23 which leads to a suitable point of discharge (not shown). As is well known in the art, the supply pipe 22 may be connected to either the piping 19 or the discharge pipe 15, and the discharge pipe 23 may likewise be connected to either the piping 19 or the discharge pipe 15 through the four-way valve 21 by rotating a suitable handle 24 thereof.

Received in the lower threaded opening 17 of the casing head 13 is the upper end of a wash tubing 27 which extends downwardly through the casing 10 in sections, as is well known in the art, to a point adjacent the lower end of the casing, the lower end of the wash tubing having connected thereto by a collar 28 a perforated skeeter bill 29, the lower end of which may be closed if desired. Vertically disposed along the lower end of the wash tubing 27 are a plurality of valve elements 30 which are identical in construction, and of which two are shown in Fig. 1, although it is to be understood that any desired number of these valve elements may be provided as desired.

Referring to Figs. 2, 3, and 4, each of the valve elements 30 is positioned to register with a slot 31 formed in the wash tubing 27, preferably by cutting away one side of the wash tubing to form flat faces 32 thereon. Each of the valve elements 30 is comprised of a flat plate member 33 which is adapted to make a close fit with the slot 31, and which is provided with a plurality of pairs of spaced plate openings 34 therethrough. Adapted to lie flush on the flat plate member 33 is a cage element 35 which is preferably provided with an arcuate outer face 36, the cage element being rigidly fixed with relation to the flat plate member 33 by a plurality of bolts 37 passing through both members. Drilled through the cage element 35 are a plurality of holes 38, the inner ends of which are conically counterbored to provide a conical chamber 39, the cage element 35 being positioned relative to the plate member 33 so that each of the conical chambers 39 communicates with a pair of the plate openings 34, as best shown in Fig. 4. Disposed in each of the conical chambers 39, and held therein between the cage element 35 and the plate member 33, is a ball valve element 40 adapted to seat in the outer end of the conical chamber to close the hole 38. I prefer to secure the valve elements 30 to the wash tubing 27 by welding a bead 41 between the flat faces 32 of the wash tubing and the sides of the valve elements 30. It is also to be noted that the maximum external diameter of the wash string 27 with the valve elements 30 therein is less than the external diameter of the couplings 28, thus permitting the wash string with the valve elements 30 thereon to be run easily into the tubing without catching on projections or couplings in the casing.

My invention is particularly adapted to be used in starting the natural flow of an oil well after the same has been drilled and cased, at which time heavy drilling mud has been plastered onto the walls of the oil bearing formation, and particularly the uncased portions 11 thereof. Therefore, the parts of the apparatus are assembled as shown in Fig. 1 upon completion of the well but before the same has started to flow naturally. At the start of operations, the discharge valve 16 is opened, and the four-way valve 21 is adjusted so as to provide communication between the supply pipe 22 and the pipe 19 and simultaneously between the discharge pipes 15 and 23. A cleaning fluid, such as clean crude oil, water, high gravity hydrocarbons, or other suitable cleaning fluid, is conveyed under pressure from a suitable source of supply (not shown) through the supply pipe 22, the four-way valve 21, the piping 19, and the wash tubing 27, downwardly through the well, the same being discharged outwardly through the skeeter bill 29 into the perforated liner 12 through which it flows to wash the heavy drilling mud from the uncased portion 11 of the well. The cleaning fluid then flows upwardly through the well casing 10 around the wash tubing 27 and discharges from the upper end thereof through the discharge pipe 15, the four-way valve 21, and the discharge pipe 23. This circulation of cleaning fluid is continued until the uncased portion 11 of the well has been sufficiently cleaned of the heavy drilling mud adhering to the walls thereof to permit oil to flow from the oil bearing formation directly into the lower end of the well, which production fluid mixes with the cleaning fluid and circulates upwardly therewith and discharges through the discharge pipe 15. As the washing action of the cleaning fluid on the uncased portion 11 of the well continues, the natural flow of production fluid into the well increases, sometimes quite rapidly. If it is desired to continue the cleaning action, but at the same time to maintain the natural flow from the well below a desired amount, the flow through the discharge pipe 15 may be throttled by regulating the discharge valve 16, and the throttled flow may thus be continued until the well is cleared of drilling mud. While the cleaning fluid is being circulated downwardly through the wash tubing 27, it freely flows outwardly through the plate openings 34 into the conical chambers 39 of the valve elements 30, causing the ball valve elements 40 to seat in the outer ends of the conical chambers to close the holes 38 to prevent an outward flow of the cleaning fluid from the interior to the exterior of the wash tubing. The valve elements 30 thus remain closed so long as the cleaning fluid is being supplied under pressure to the well through the wash tubing 27. This, obviously, permits the cleaning fluid to be carried directly to the bottom of the wash tubing to be discharged therefrom.

When the well has been sufficiently cleaned of drilling mud adhering to the walls thereof, the flow of fluid in and from the well is redirected so that the natural flow of production fluid changes direction to flow into the wash string 27 and upwardly therethrough. This redirection of flow may be accomplished under some conditions by first resetting the four-way valve 21 so as to connect the pipe 19 and the discharge pipe 23 and to connect the pipes 15 and 22, and then closing the valve 16 to permit natural well pressure to build up within the casing 10 to a value at which the upward flow of production fluid through the casing ceases and the direction of the flow thereof automatically changes to flow through the skeeter bill 29 into the wash string and upwardly therethrough. By adjustment of the valve 20, the natural flow may be accurately controlled as desired. Under certain well conditions, the well pressure may be insufficient to start automatically the change in direction of flow of production fluid, and under such conditions the redirection may readily be accomplished by leaving the valve 16 open and pumping cleaning or other fluid from the pipe 22 through the four-way valve 21 and the pipe 15 into the upper end of the casing 10, which pumped flow may be continued until the natural production flow is redirected upwardly through the wash string 27, at which time the pumped flow may be stopped by closing the valve 16, the natural flow then continuing upwardly through the wash string. Thus, this redirection of flow of pumped fluid acts as a primer, under such conditions, to start the natural redirection of flow from the well, and may be discontinued as soon as the natural flow is definitely redirected.

On the other hand, when the well starts to flow naturally the direction of fluid flow is redirected so as to flow upwardly through the wash tubing 27, the pressure differential across the ball valve elements 40 is reversed, permitting them to unseat and permitting well fluid to flow from the casing directly therethrough into the wash tubing. Thus, if the perforations of the skeeter bill 29 becomes clogged with foreign material, the valve element 30 still provides a means of ingress of the oil into the wash tubing 27.

Fig. 5 shows a slightly modified form of construction of my invention, in which a liner 12a is connected directly to the lower end of the wash string 27a by a coupling 28a, the skeeter bill 29 being omitted from this form of construction if desired. In this form of the invention, the liner is run into the well on the lower end of the wash tubing 27a, but may be left in the well by rotating the wash tubing so as to disengage the wash tubing from the coupling 28a. This may be desirable if the liner becomes sanded up in the well so as to prevent ready removal. The embodiment shown in Fig. 5 may be operated exactly the same as the embodiment shown in Fig. 1, the cleaning fluid being conveyed downwardly through the wash tubing 27a and the liner 12a and outwardly through the perforations of the latter into the well to clean the formation of the same. In Fig. 5 I show diagrammatically an oil bearing stratum designated as lying between the lines Ba—Ba, similar to the stratum indicated in Fig. 1 by the lines B—B. In Fig. 5, in addition, I show an additional oil bearing stratum lying between the lines C—C above the lower stratum and show the casing 10a perforated at 50, as is well known in the art, to provide access between the upper oil bearing stratum and the interior of the casing. The casing 10 of Fig. 1 may likewise be perforated if desired. Oil may thus be produced from either the upper or lower strata of the well, the natural flow thereof being at least partially conveyed into the wash tubing 27a through the valve elements 30a spaced throughout at least part of the length of the wash tubing. It will thus be understood that the valve elements 30 and 30a insure the delivery of the cleaning fluid in the cleaning operation to the lower end of the wash tubing, but permit the entry of a natural flow of oil into the wash tubing therethrough after natural flow has commenced.

In Fig. 6, an alternative embodiment of my invention is shown, in which parts similar to those shown in Fig. 1 are given the same reference numerals, but with the suffix *b* added thereto. The chief difference between the construction shown in Fig. 1 and that shown in Fig. 6 is that the latter omits the use of a liner, such as the liners 12 or 12a, and continues the valve elements 30b to the bottom of the wash tubing 27b, the latter being screw-fitted with a nipple 45 having an opening 46 in the lower end thereof. It is to be noted that in the construction shown in Fig. 6 the nipple 45 is positioned adjacent the bottom of the well, and that the valve elements 30b operate as substitutes for the liners of the preceding figures. This construction is of particular utility under certain well conditions, and may be used as desired.

It will be understood that although I have shown preferred embodiments of my invention, I do not intend to be limited thereto, but intend to be afforded the full scope of the following claims.

I claim as my invention:

1. In a well system for starting the natural flow of a well, the combination of: a first tubing extending downwardly through the well to a point adjacent the open wall formation of the well; a second tubing extending downwardly through the well to a point adjacent said open formation; means for supplying a cleaning fluid so as to flow downwardly through said first tubing and upwardly through said second tubing, the circulation of said cleaning fluid cleaning drilling mud from the walls of said open formation so as to permit well fluid to flow naturally from said formation into the well and upwardly through said second tubing; means for connecting said first tubing with a point of discharge; means for stopping said flow of fluid upwardly through said second tubing so as to permit well fluid to change its direction of flow to flow upwardly through said first tubing; and a plurality of check valves longitudinally spaced along said first tubing above the lower end thereof, each of said check valves being adapted to prevent a flow of said cleaning fluid therethrough from the interior of said first tubing to the exterior thereof but permitting a reverse flow of said well fluid.

2. In a well system for starting the natural flow of a well, the combination of: a wash string extending downwardly through said well to a point adjacent the open wall formation of the well; a plurality of longitudinally spaced check valves associated with said wash string and adapted to prevent a flow of fluid therethrough from the interior to the exterior of said wash string but permitting a reverse flow of fluid; a perforated liner connected to the lower end of said wash string; means for supplying a cleaning fluid so as to flow downwardly through said wash string and upwardly around the outside thereof in the well so as to clean drilling mud from the open wall formation of the well; discharge tubing means communicating with said well and adapted to receive and convey said cleaning fluid and drilling mud from the well to a point of discharge; valve means in the line of said discharge tubing means adapted to be closed when said drilling mud has been cleaned from said open formation sufficiently to permit a natural flow of well fluid from said formation into said well; and means for connecting said wash string to a point of discharge so as to permit said well fluid to reverse its flow to flow upwardly through said wash string.

3. In a well device, the combination of: a tubing adapted to be disposed vertically in a well, said tubing having a longitudinal slot therethrough; a bar element in said slot, said bar element having a plurality of bar openings therethrough; valve cage means having a plurality of conical openings therein adapted to cooperate with said bar openings to form a ball valve cage above each of said bar openings; ball check valve means in each of said ball valve cages; and means for securing said bar elements, said valve cage means, and said tubing together so as to form a fluid-tight fit therebetween.

4. In a well device, the combination of: a tubing adapted to be disposed vertically in a well, said tubing having a longitudinal slot therethrough; a bar element in said slot, said bar element having a plurality of bar openings therethrough; valve cage means having a plurality of conical openings therein, each of said conical openings being adapted to cooperate with two of said bar openings to form a ball valve cage above each of said bar openings; ball check valve means in each of said ball valve cages; and means for securing said bar elements, said valve cage means, and said tubing together so as to form a fluid-tight fit therebetween.

5. In a well system for starting the natural flow of a well having drilling mud in sealing contact with the producing formation of the well, the combination of: a tubing set in the well in an operating position, said tubing being adapted to permit a flow of fluid therethrough in either direction when in said operating position; supply means for circulating a cleaning fluid downwardly through said tubing, outwardly adjacent the lower end thereof, and upwardly therearound to clean the walls of the well of drilling mud so as to permit well fluid to flow naturally into the well from the producing formation; control means for alternately connecting the upper end of said tubing with said supply means and with a point of discharge; means for stopping the flow of fluid upwardly in the well around said tubing; and check valve means in the line of said tubing and positioned a substantial distance above the lower end thereof for permitting said well fluid to flow into said tubing therethrough and upwardly through said tubing when the flow of fluid upwardly around said tubing is stopped, said check valve means preventing a reverse flow of said cleaning fluid therethrough.

RALPH B. LLOYD.